(12) United States Patent
Hartmann (10) Patent No.: US 12,553,554 B2
(45) Date of Patent: Feb. 17, 2026

(54) PLUG-IN CONNECTOR FOR CONNECTING PIPES FOR LIQUIDS OR GASEOUS MEDIA

(71) Applicant: Henn GmbH & Co KG., Dornbirn (AT)

(72) Inventor: Harald Hartmann, Bartholomäberg (AT)

(73) Assignee: Henn GmbH & Co. KG., Dornbim (AT)

( * ) Notice: Subject to any disclaimer, the term of this patent is extended or adjusted under 35 U.S.C. 154(b) by 0 days.

(21) Appl. No.: 18/708,375

(22) PCT Filed: Nov. 8, 2022

(86) PCT No.: PCT/AT2022/060387
§ 371 (c)(1),
(2) Date: May 8, 2024

(87) PCT Pub. No.: WO2023/081947
PCT Pub. Date: May 19, 2023

(65) Prior Publication Data
US 2025/0012389 A1    Jan. 9, 2025

(30) Foreign Application Priority Data
Nov. 9, 2021 (AT) .............................. A 50890/2021

(51) Int. Cl.
*F16L 37/088* (2006.01)
*F16L 37/084* (2006.01)

(52) U.S. Cl.
CPC ....... *F16L 37/0885* (2019.08); *F16L 37/0847* (2013.01); *F16L 2201/10* (2013.01)

(58) Field of Classification Search
CPC ............... F16L 37/0885; F16L 37/0841; F16L 37/1225; F16L 37/12; F16L 37/14; F16L 37/142; F16L 37/144; F16L 2201/10
See application file for complete search history.

(56) References Cited

U.S. PATENT DOCUMENTS

| | | |
|---|---|---|
| 11,566,739 B2 | 1/2023 | Kreider |
| 2018/0216766 A1 | 8/2018 | Clapper et al. |

(Continued)

FOREIGN PATENT DOCUMENTS

| | | |
|---|---|---|
| AT | 509196 B1 | 7/2011 |
| DE | 202020103903 U1 | 7/2020 |
| ES | 2823374 A1 | 5/2021 |

OTHER PUBLICATIONS

International Search Report for corresponding International Application No. PCT/AT2022/060387, mailed Feb. 10, 2023, 4 pages.

*Primary Examiner* — Aaron M Dunwoody
(74) *Attorney, Agent, or Firm* — FisherBroyles, LLP; Douglas P. LaLone (57) ABSTRACT

The disclosure relates to a plug connector for connecting pipes for liquids or gaseous media, comprising a connector body and a locking element. An indicator element includes an indicator surface, wherein the indicator element is pretensioned by a spring element into an indicator position and can be moved between a rest position, in which the indicator surface is at least partly covered, and the indicator position, in which the indicator surface is visible, wherein the indicator element is coupled to a first latching element and a second latching element. The first latching element is configured to hold the indicator element in the rest position against the spring force of the spring element and the second latching element is configured to hold the indicator element in an intermediate position between the rest position and the indicator position against the spring force of the spring element.

16 Claims, 4 Drawing Sheets

(56) References Cited

U.S. PATENT DOCUMENTS

| | | | |
|---|---|---|---|
| 2020/0191310 A1* | 6/2020 | Kim | ............... F16L 37/12 |
| 2020/0309298 A1 | 10/2020 | Kuhn et al. | |
| 2021/0396336 A1 | 12/2021 | Schröter | |
| 2022/0275894 A1 | 9/2022 | Baldreich | |
| 2023/0213126 A1 | 7/2023 | Hartmann | |

* cited by examiner

PLUG-IN CONNECTOR FOR CONNECTING PIPES FOR LIQUIDS OR GASEOUS MEDIA

CROSS-REFERENCE TO RELATED APPLICATIONS

This application is a U.S. National Phase based on, and claiming priority to, PCT/AT2022/060387, filed on Nov. 8, 2022 entitled "PLUG-IN CONNECTOR FOR CONNECTING PIPES FOR LIQUIDS OR GASEOUS MEDIA", which based on and claims priority to Austria Patent Application No. A50890/2021, filed on Nov. 9, 2021, each of which is hereby incorporated by reference in it's entirety.

BACKGROUND OF THE DISCLOSURE

The disclosure relates to a plug connector for connecting pipes for liquid or gaseous media, as well as a method for establishing a plug connection between the plug connector and a mating plug connector.

A variety of plug connectors are known from WO 2018/144902 A1, WO 2018/102213 A1, and EP 3 179 148 A1. The plug connectors known from these documents have the disadvantage that it cannot be determined clearly whether the plug connectors are correctly joined together.

Overview

The object of the present disclosure was to overcome the shortcomings of the prior art and to provide a plug connector and a method for establishing a plug connection between the plug connector and a mating plug connector, which improve the controllability of the correct connection.

This object is achieved by means of a device and a method according to the claims.

According to the disclosure, a plug connector for connecting pipes for liquid or gaseous media is formed. The plug connector comprises:
- a connector body, which has at least a first casing section, which forms a receiving space for receiving a part of a mating plug connector, wherein at least two passages are formed in the first casing section;
- one locking element, which is provided for securing the plug connector relative to the mating plug connector, wherein the passages in the connector body serve to receive the locking element.

Furthermore, an indicator element is formed which has an indicator surface, wherein the indicator element is displaceable between a rest position, in which the indicator surface is at least partly covered, and an indicator position, in which the indicator surface is visible, wherein a spring element is formed which pretensions the indicator element in the direction of the indicator position, wherein the indicator element is coupled to a first latching element and a second latching element, wherein the first latching element is configured to hold the indicator element against the spring force of the spring element in the rest position and wherein the second latching element is configured to hold the indicator element against the spring force of the spring element in an intermediate position between the rest position and the indicator position.

The plug connector according to the disclosure entails the advantage that the indicator element can be used to signal that the mating plug connector is correctly joined to the plug connector. In particular, the structure of the plug connector according to the disclosure makes it possible to ensure that the indicator element only assumes its indicator position when the mating plug connector is mated with the plug connector and at the same time the locking element for securing the mating plug connector in the plug connector is also correctly engaged in the securing groove of the mating plug connector, thus further preventing unintentional pulling apart of the mating plug connector and the plug connector.

Furthermore, it can be useful if the first latching element has a first latching projection and a first latching lug is formed on the connector body, wherein the first latching projection is in engagement with the first latching lug in the unplugged state of the plug connector and is held in the rest position against the spring force of the spring element. In particular, such a structure can ensure that a false indication of correct locking is prevented as far as possible.

Furthermore, it can be provided that the first latching element has a first actuating lug, wherein the actuating lug projects into the receiving space. This measure can be used to achieve an unlocking option and thus a release option for releasing the displacement of the indicator element into its indicator position.

In addition, it can be provided that the first actuating lug protrudes so far into the receiving space that when the actuating lug is pushed radially out of the receiving space, the first latching projection is raised above the first latching lug. This measure can be used to achieve an unlocking option and thus a release option for releasing the displacement of the indicator element into its indicator position.

An embodiment, according to which it can be provided that the second latching element rests against the locking element when the indicator element is held in the intermediate position, is also advantageous. This measure ensures that the indicator element can only be moved into its indicator position when the locking element is actually correctly engaged in the securing groove.

According to an advancement, it is possible that the second latching element has a latching hook which is configured in such a way that it serves to hook into the locking element in an outwardly displaced position of the locking element. This measure ensures that the indicator element can only be moved into its indicator position when the locking element is actually correctly engaged in the securing groove.

Method for producing a plug connection by means of a plug connector, in particular by means of a plug connector according to one of the preceding claims, characterized by the method steps:
- providing the plug connector comprising
- a connector body which has at least a first casing section which forms a receiving space for receiving a part of a mating plug connector, wherein at least two passages are formed in the first casing section;
- a locking element which is provided for securing the plug connector relative to the mating plug connector, wherein the passages in the connector body serve to accommodate the locking element;
- an indicator element which has an indicator surface, wherein the indicator element is displaceable between a rest position, in which the indicator surface is at least partly covered, and an indicator position, in which the indicator surface is visible, wherein a spring element is formed which pretensions the indicator element in the direction of the indicator position, wherein the indicator element is coupled to a first latching element and a second latching element, wherein the first latching element is configured to hold the indicator element in the rest position against the spring force of the spring element and wherein the second latching element is configured to hold the indicator element in an intermediate position between the rest position and the indicator position against the spring force of the spring element;

providing a mating plug connector, wherein the mating plug connector has a cone and a securing groove;

inserting the mating plug connector into the plug connector, wherein the locking element and the first latching element come to rest on the cone and are pressed outwards by axial insertion of the mating plug connector into the plug connector, wherein the indicator element is displaced from a rest position into its intermediate position at a first insertion depth of the mating plug connector, wherein in the intermediate position, the second latching element cooperates with the locking element, and the indicator element is held in the intermediate position by the locking element, wherein upon further axial insertion of the mating plug connector into the plug connector, the locking element falls into the securing groove and the second latching element is released, whereby the indicator element is displaced into its indicator position by the spring element.

The method according to the disclosure entails the advantage that the indicator element can be used to signal that the mating plug connector is correctly joined to the plug connector. In particular, the method steps according to the disclosure make it possible to ensure that the indicator element only assumes its indicator position when the mating plug connector is mated with the plug connector and at the same time the locking element for securing the mating plug connector in the plug connector is also correctly engaged in the securing groove of the mating plug connector, thus further preventing unintentional pulling apart of the mating plug connector and the plug connector.

In addition, it may be provided that a first actuating lug of the first latching element protrudes into the receiving space, wherein during axial insertion of the mating plug connector into the plug connector, the actuating lug rests against the cone of the mating plug connector and is pushed radially out of the receiving space by the latter, wherein, in this process, a first latching projection arranged on the first latching element is lifted over a first latching lug arranged on the connector body.

Furthermore, it may be provided that the second latching element has a latching hook which hooks into the locking element when the latter is in an outwardly displaced position, whereby the indicator element is held in the intermediate position by the locking element against the spring force of the spring element.

According to a particular embodiment, it is possible that the plug connector is dimensioned in such a way that the first latching element secures the indicator element in its rest position again when the mating plug connector is pulled out of the plug connector without the locking element having fallen into the securing groove.

Moreover, it may be useful if the indicator element has a coding surface, which is visible in the indicator position of the indicator element and, in the rest position of the indicator element, is at least partially concealed, wherein the coding surface has a machine-readable code, such as a data matrix code. By this measure, it can be achieved that not only an optical check of the correct positioning can be carried out by the machine operator but that also a machine-readable check can be carried out and/or that the information can be stored accordingly.

Moreover, it is also conceivable that the information of the machine-readable check is stored and used for enabling and/or preventing further production steps. Hence, it can be achieved that an operator error can be largely precluded.

The indicator surface may simultaneously serve as a coding surface. Hence, the machine-readable code can be arranged directly on the indicator surface.

In particular, it may be advantageous if the indicator surface is configured, at least in some regions, to have a corresponding signal color, such as green, and/or that a lettering, such as "OK", is arranged on the indicator surface. By these measures, it can be achieved that even a person not proficient and/or not trained is able to visually identify a correct locking lug of the locking element and/or a correct joining of the mating plug connector and the plug connector.

For the purpose of better understanding of the disclosure, it will be elucidated in more detail by means of the figures below.

These show in a respectively very simplified schematic representation.

DETAILED DESCRIPTION OF THE FIGURES

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
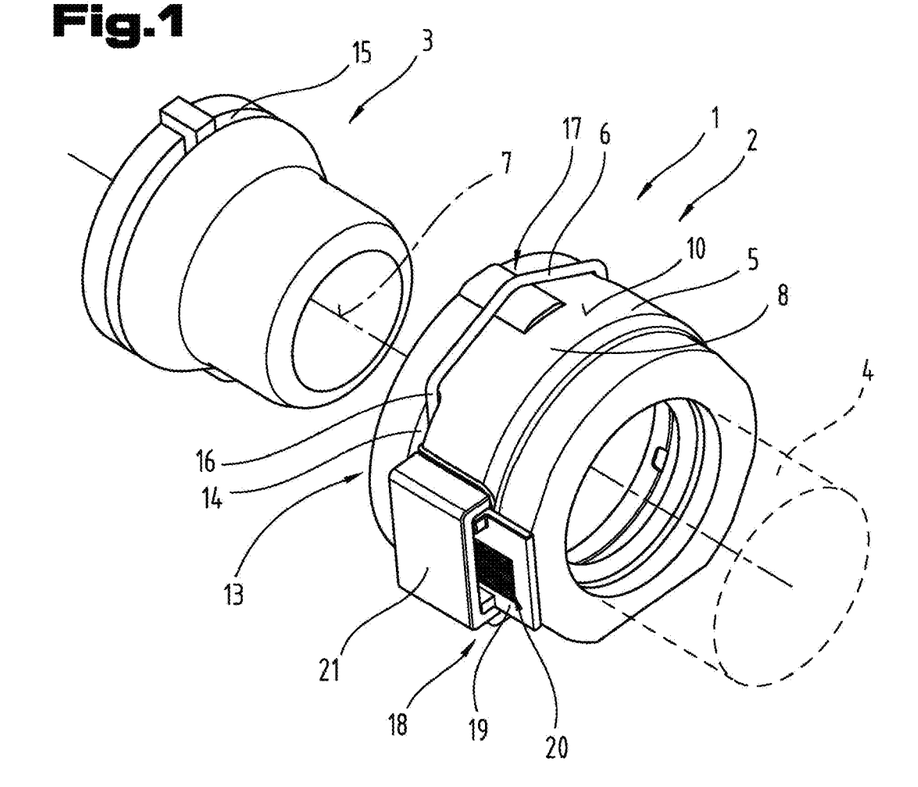
FIG. 1 a schematic representation of a plug assembly in an unplugged state.

FIG. 1 shows a perspective view of a plug assembly 1 with a plug connector 2. FIG. 1 further schematically represents a mating plug connector 3, which can be connected to the plug assembly 1. In the view according to FIG. 1, the mating plug connector 3 is not plugged into the plug connector 2. The cooperation between the plug assembly 1 and a mating plug connector 3 is sufficiently described in AT 509 196 B1.

Moreover, a tube 4 is schematically shown, to which the plug connector 2 may be coupled. The tube 4 may, for example, be a rigid element, such as a plastic tube. In a different embodiment variant, the tube 4 may be formed as a flexible pipe made of a rubber material.

The plug connector 2 comprises a connector body 5, which is preferably formed as an injection-molded part, in particular from a plastic material.

The plug assembly 1 is preferably used in a vehicle, in particular in a road-bound power-driven vehicle having a combustion engine, such as a car or a truck.

Of course, it is also conceivable that the plug assembly 1 is used in any other application, in particular another application in a combustion engine. This may, for example, be the use of the plug assembly 1 in a stationary aggregate, in a marine engine, in aircraft engine, in a construction machine, and so one. The plug assembly 1 can also be used for water pipes in a domestic installation, for example.

In particular, the plug assembly 1 may be used for connecting different components of the fresh air supply means to the combustion engine. It can for example be provided that the plug connector 2 with the corresponding mating plug connector 3 is provided for connecting two parts in the intake area of a turbocharger. It can further also be provided, for example, that such a plug assembly 1 is used for connecting two components on the pressure side leaving the turbocharger. Moreover, it is also conceivable that the plug assembly 1 is used in water-bearing components, such as coolant hoses, in particular in a combustion engine.

As can further be seen in FIG. 1, it is provided that the locking element 6 is provided for securing the plug connector 2 and the mating plug connector 3 relative to one another.

The locking element 6 is constructed such that it can easily be activated and deactivated such that the plug connector 2 and the mating plug connector 3 can be separated from one another and/or connected to one another as needed.

The locking element 6 may be brought into a latching position, in which the plug connector 2 and the mating plug connector 3 are secured relative to one another.

DETAILED DESCRIPTION OF THE EMBODIMENTS

Moreover, the locking element 6 may be brought into a release position, in which the mating plug connector 3 can be inserted into the plug connector 2 or removed therefrom.

In particular, it may be provided that the locking element 6 is configured in the form of a spring element.

As shown in FIG. 1, it may be provided that the mating plug connector 3 is axially displaced along a longitudinal axis 7 of the plug connector 2 in order to insert the mating plug connector 3 into the plug connector 2.

As can be seen in FIG. 1, it can be provided that a first casing section 8, which surrounds the central longitudinal axis 7 of the plug connector 2 in the shape of a sleeve, is formed on the connector body 5.

The first casing section 8 can have an inner casing surface 9 and an outer casing surface 10.

In the region of the first casing section 8, the plug connector 2 has a receiving space 13. The receiving space 13 can be surrounded by the first casing section 8 and can serve to receive a part of the mating plug connector 3.

The connector body 5 can have two opposite passages 14 that penetrate the first casing section 8. In the latching position of the locking element 6, which it assumes in the plugged in and locked state, the locking element 6 projects through the corresponding passage 14 into the receiving space 13. In this regard, the locking element 6 cooperates with a securing groove 15 of the mating plug connector 3. In particular, in the latching position of the locking element 6, the locking element 6 protrudes through the passages 14 into the securing groove 15 of the mating plug connector 3.

In addition to this, it may be provided that the locking element 6 has latching regions 16 and a holding region 17, by which it can be gripped so it can be inserted into the connector body 5 and so it can be moved between the latching position and the release position.

When the locking element 6 is in its latching position, the latching regions 16 project into the receiving space 13 and the mating plug connector 3 is axially secured relative to the plug connector 2. In particular, it is provided here that the latching regions 16 of the locking element 6 protrude through the passages 14 into the securing groove 15 of the mating plug connector 3. When the locking element 6 is in its release position, the latching regions 16 do not project into the receiving space 13 and the mating plug connector 3 is axially displaceable relative to the plug connector 2.

Furthermore, an indicator element 18 can be provided which serves for signaling whether the locking element 6 is correctly locked.

Furthermore, it may be provided that an indicator surface 19 is formed on the indicator element 18.

Furthermore, it may be provided that a machine-readable code 20 is arranged on the indicator surface 19 of the indicator element 18.

The indicator surface 19 may have a signal color, such as a green color, in order to be able to signal that the locking element 6 is locked correctly. As an alternative or in addition thereto, it is also conceivable that a lettering is arranged on the indicator surface 19, or that the indicator surface 19 is perforated accordingly by a lettering, which also signals the correct locking of the locking element 6.

In the representation according to FIG. 1, the indicator element 18 is in a rest position, which signals that the mating plug connector 3 is plugged into the plug connector 2 either not at all or not correctly.

Figure 2:
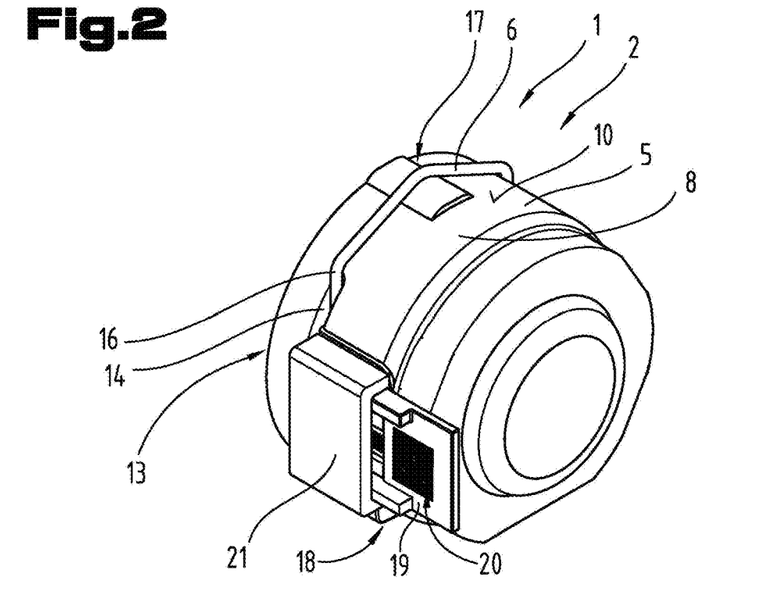
FIG. 2 a schematic representation of a plug assembly in a plugged-in state.

In FIG. 2, the plug connector 2 is shown in a further perspective view, wherein the mating plug connector 3 is inserted into the plug connector 2 and is correctly locked with it, wherein, again, equal reference numbers and/or component designations are used for equal parts as before in FIG. 1. In order to avoid unnecessary repetitions, it is pointed to/reference is made to the detailed description in FIG. 1 preceding it.

In the representation according to FIG. 2, the indicator element 18 is in an indicator position, which signals that the mating plug connector 3 is plugged into the plug connector 2 correctly.

The functionality of the indicator element 18 and/or the transition from the rest position into the indicator position of the indicator element 18 is explained in more detail with the aid of FIGS. 4 to 8.

As can also be seen in FIGS. 1 and 2, it may be provided that a cover 21 is formed which can serve to hold the indicator element 18 on the connector body 5. Furthermore, it may be provided that the cover 21 serves to at least partially cover the indicator surface 19 in the rest position of the indicator element. The cover 21 can be in the form of an injection-molded part. Furthermore, it may be provided that the cover 21 is coupled to and/or slipped onto the connector body 5 by means of a positive connection.

Figure 3:
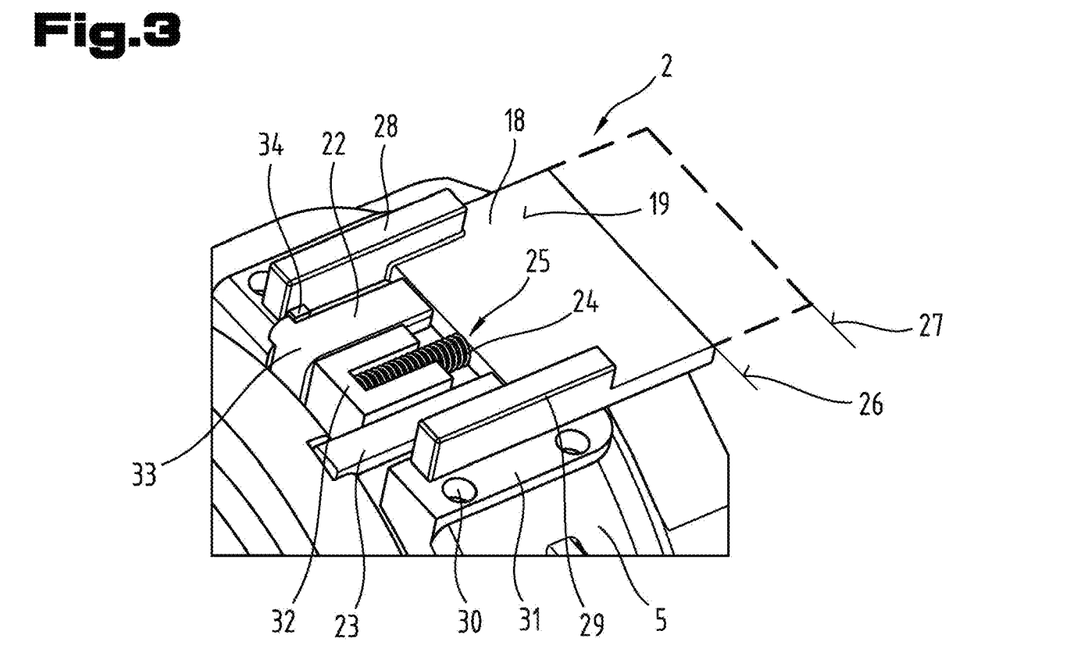
FIG. 3 a detailed view of an indicator element for signaling a correctly joined plug connector and mating plug connector of the plug assembly.

FIG. 3 shows a detailed view of the plug connector 2, wherein, again, equal reference numbers and/or component designations are used for equal parts as before in FIGS. 1 and 2. In order to avoid unnecessary repetitions, it is pointed to/reference is made to the detailed description in FIGS. 1 and 2 preceding it.

For the sake of clarity, the cover 21 is not shown in the detailed view in FIG. 3. This makes the inside of the indicator element 18 visible. As can be seen from FIG. 3, it may be provided that the indicator element 18 has a first latching element 23. Furthermore, it may be provided that the indicator element 18 has a second latching element 23. The first latching element 22 and the second latching element 23 may be formed as integral components of the indicator element 18. In other words, the first latching element 22 and the second latching element 23 may be formed in one piece with the indicator element 18.

In an alternative embodiment variant, it may be provided that the first latching element 22 and/or the second latching element 23 are formed as independent components which are coupled to the indicator element 18. In particular, the latching elements 22, 23 can be coupled to the indicator element 18 by means of a materially bonded connection.

As can also be seen from FIG. 3, it can be provided that the first latching element 22 and/or the second latching element 23 are configured as components with an elongated extension. As a result, the end of the latching element 22, 23 which is remote from the indicator element 18, can be displaced and/or bent relative to the indicator element 18, wherein an elastic resilience of the latching element 22, 23 can be utilized.

As can also be seen from FIG. 3, it can be provided that the indicator element 18 is coupled to a spring element 24. The spring element 24 can be guided by a spring element guide 25. In particular, it may be provided that the spring element guide 25 is in the form of a tappet and/or pin which is arranged on the indicator element 18. The spring element guide 25 can be configured as an integral part of the indicator element 18. In an alternative embodiment variant, it is also conceivable that the spring element guide 25 is coupled to the indicator element 18. By means of the spring element 24, the indicator element 18 can be pretensioned and/or urged from its rest position 26, as shown in FIG. 3, into an indicator position 27. The indicator element 18 can be fixed in its rest position 26 by means of the first latching element 22.

As can also be seen in FIG. 3, it may be provided that a first guide rail 28 is arranged on the indicator element 18. Furthermore, it may be provided that a second guide rail 29 is arranged on the indicator element 18. The guide rails 28, 29 can be used for guided displacement of the indicator element 18. In particular, it may be provided that the guide rails 28, 29 correspond to the cover 21. The guide rails 28, 29 can be formed in one piece with the indicator element 18.

As can also be seen from FIG. 3, it may be provided that one or more receiving openings 30 are formed on the connector body 5 of the plug connector 2, which serve to receive and/or hold the cover 21. In particular, it may be provided that the cover 21 has one or more pins which are inserted into the receiving opening 30. In particular, it may be provided that an indicator element holder 31 is formed, which can serve to hold the indicator element 18. The receiving openings 30 can be arranged in the indicator element holder 31. The indicator element holder 31 can be coupled to the connector body 5.

Furthermore, it may be provided that a spring element counterholder 32 is formed, which serves for contact with the spring element 24. The spring element counterholder 32 can be arranged in a fixed position on the connector body 5. In particular, it may be provided that the spring element counterholder 32 is arranged on the indicator element holder 31. Furthermore, it may be provided that the spring element counterholder 32 is formed on the display element holder 31.

In one embodiment, it may be provided that the indicator element 18 is formed as an injection-molded part. In particular, it may be provided that the indicator element 18, together with the first latching element 22, the second latching element 23, the first guide rail 28, the second guide rail 29 and the spring element guide 25 is formed in one piece as an injection-molded part.

Such an injection-molded part can, for example, be formed from a thermoplastic material such as polyethylene.

As can also be seen from FIG. 3, it may be provided that a first latching projection 33 is formed on the first latching element 22. In particular, it may be provided that the first latching projection 33 is arranged at the end of the first latching element 22 distal to the indicator element 18.

Furthermore, it may be provided that a first latching lug 34 is formed, which corresponds to the first latching projection 33. The first latching lug 34 can be arranged in a fixed position on the connector body 5. In particular, it is conceivable that the first latching lug 34 is coupled to the indicator element holder 31.

As can be seen from FIG. 3, the first latching projection 33 can be configured as a lateral projection on the first latching element 22. When the indicator element 18 is in its rest position 26, the first latching projection 33 and the first latching lug 34 can engage positively with one another. As a result, the indicator element 18 can be prevented from moving from its rest position 26 to the indicator position 27 as long as the first latching projection 33 and the first latching lug 34 engage with each other and/or are in positive connection with each other.

FIGS. 4 to 8 show individual method steps for inserting the mating plug connector 3 into the plug connector 2, wherein again, equal reference numbers and/or component designations are used for equal parts as in the respectively preceding figures. In order to avoid unnecessary repetitions, it is pointed to/reference is made to the detailed description in the respectively preceding figures.

In FIGS. 4 to 8, the connector body 5 is shown cut off-center for improved visualization. The mating plug connector 3, on the other hand, is shown cut in the center. For this reason, it appears in the sectional view as if the diameter of the mating plug connector 3 is too large for the connector body 5. In addition, a seal between the connector body 5 and the mating plug connector 3 is shown schematically, although for the sake of simplicity the deformation of the seal has not been taken into account and it therefore does not protrude correctly into the mating plug connector 3 in the drawing.

Figure 4:
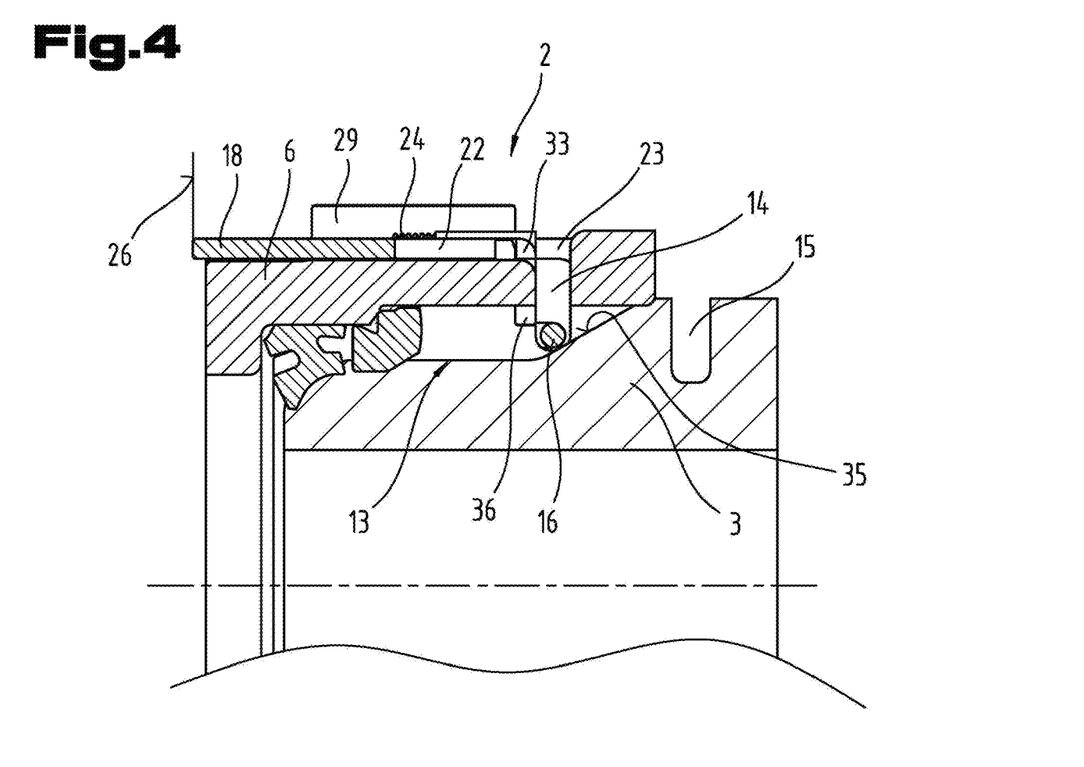
FIG. 4 a first method step for inserting the mating plug connector into the plug connector.

FIG. 4 shows a first method step for inserting the mating plug connector 3 into the plug connector 2. In this regard, in the illustration according to FIG. 4, the mating plug connector 3 is already accommodated in the receiving space 13 of the connector body 5. The latching region 16 of the locking element 6 is still in its initial position, wherein the latching region 16 is already in contact with a cone 35 of the mating plug connector 3.

As can be seen from FIG. 4, at the start of the joining process, the indicator element 18 is held in its rest position 26 by the first latching projection 33 and/or the first latching lug 34, wherein the indicator element 18 is pretensioned and/or urged towards its indicator position 27 by means of the spring element 24.

As can also be seen from FIG. 4, it can be provided that a first actuating lug 36, which projects into the receiving space 13, is formed on the first latching element 22. In particular, it may be provided that the first actuating lug 36 is arranged at the end of the first latching element 22 distal from the indicator element 18.

Figure 5:
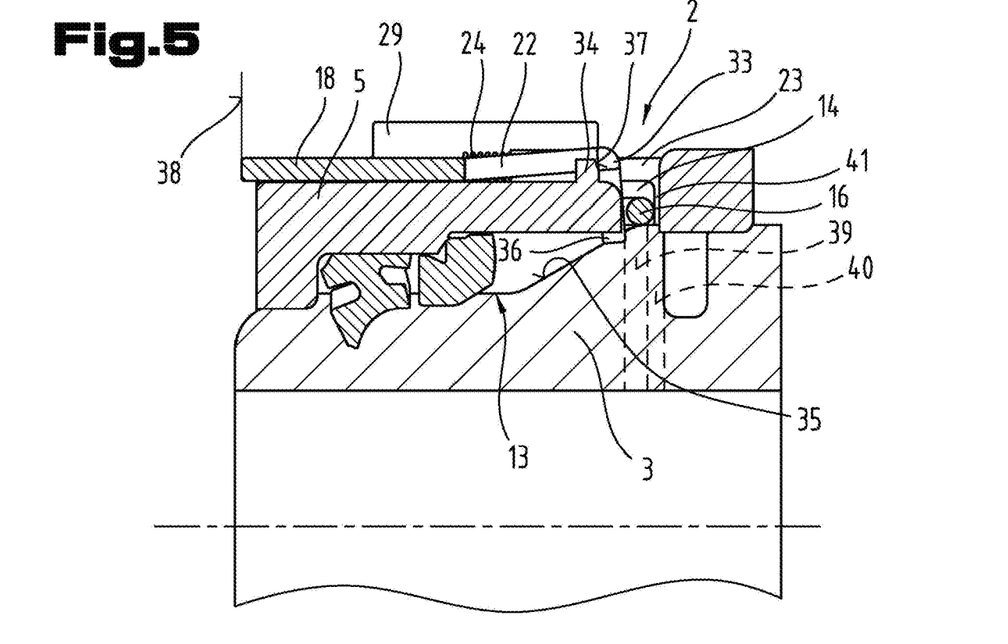
FIG. 5 a second method step for inserting the mating plug connector into the plug connector.

FIG. 5 shows a further method step for inserting the mating plug connector 3 into the plug connector 2. As can be seen from FIG. 5, it can be provided that the axial insertion of the mating plug connector 3 into the plug connector 2 raises the latching region 16 of the locking element 6, which is in contact with the cone 35, by means of the cone 35. In addition, the first actuating lug 36 can also come into contact with the cone 35, whereby the first latching element 22 is pressed radially outwards at its end distal from the indicator element 18. This results in a displacement of the first latching projection 33 towards the first latching lug 34. In particular, it may be provided that a latching lug slope 37 is formed on the first latching lug 34, wherein the first latching projection 33 rests against the latching lug slope 37 from a certain lifting height. The latching projection slope 37 causes the indicator element 18 to be displaced out of the rest position 26 towards the indicator position 27 from a certain lifting height of the first latching projection 33. In the illustration according to FIG. 5, an intermediate position 38 is assumed in this regard. In this case, it may be provided that the latching region 16 of the locking element 6 is already pressed outwards to such an extent that it rests against a transition radius 39 between the cone 35 and the cylinder section 40 or against the cylinder section 40 of the mating plug connector 3. As can also be seen from FIG. 5, it may be provided that a latching hook 41 is arranged on the second latching element 23. The latching hook 41 can be arranged at the end of the second latching element 23 distal from the indicator element 18. In particular, it may be provided that, in the state as shown and described in FIG. 5, the latching hook 41 of the second latching element 23 rests against the latching region 16 of the locking element 6.

In this way, the latching hook 41 can prevent further displacement of the indicator element 18 into its indicator position 27 for the time being.

Figure 6:
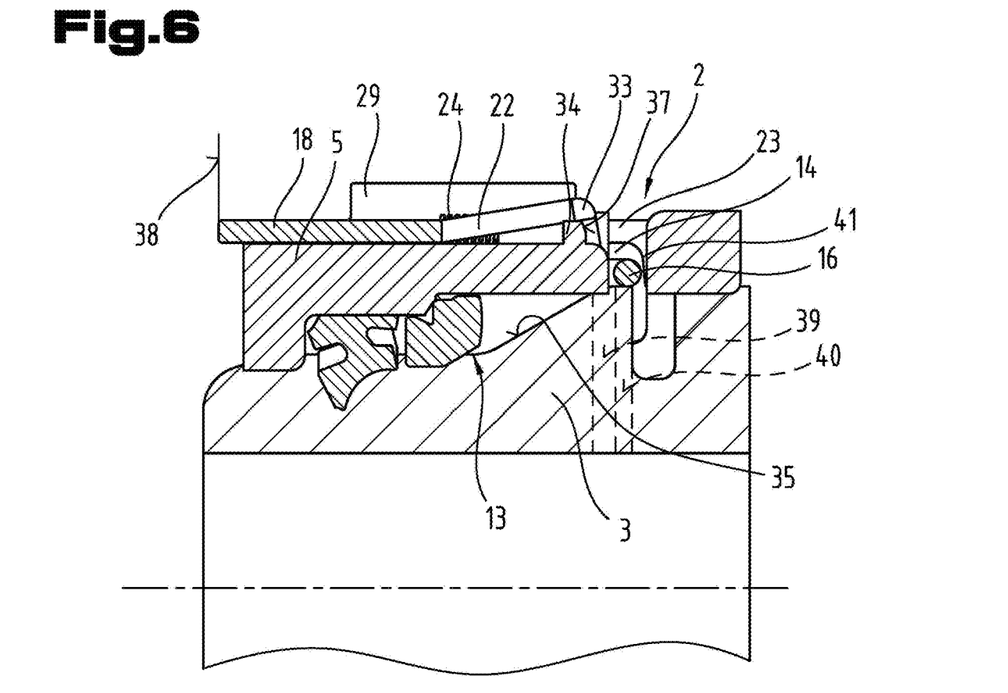
FIG. 6 a third method step for inserting the mating plug connector into the plug connector.

FIG. 6 shows a further position during the insertion process of the mating plug connector 3 into the plug connector 2.

As can be seen from FIG. 6, it is possible that the first actuating lug 36 is pushed further radially outwards by the cone 35 during further insertion of the mating plug connector 3 into the plug connector 2. In the state shown in FIG. 6, the first actuating lug 36 can rest against the transition radius 39. Furthermore, the latching region 16 of the locking element 6 can rest against the cylinder section 40 of the mating plug connector 3 at the same time. In this regard, the first latching projection 33 can already be pushed radially outwards to such an extent that it no longer rests against the first latching lug 34 and thus the indicator element 18 is held in its intermediate position 38 entirely by the latching hook 41.

In particular, it may be provided that the indicator element 18 and the mating plug connector 3 are dimensioned in relation to each other such that when the mating plug connector 3 is pulled out axially from a position, as shown in FIG. 6, it is pulled out of the plug connector 2 again. The first actuating lug 36 of the first latching element 22 slides back down the cone 35, whereby the first latching projection 33 comes back into engagement with the first latching lug 34 and the indicator element 18 is pressed back into its rest position 26 by the elasticity and/or elastic tension of the first latching element 22 backwards to the insertion process.

Figure 7:
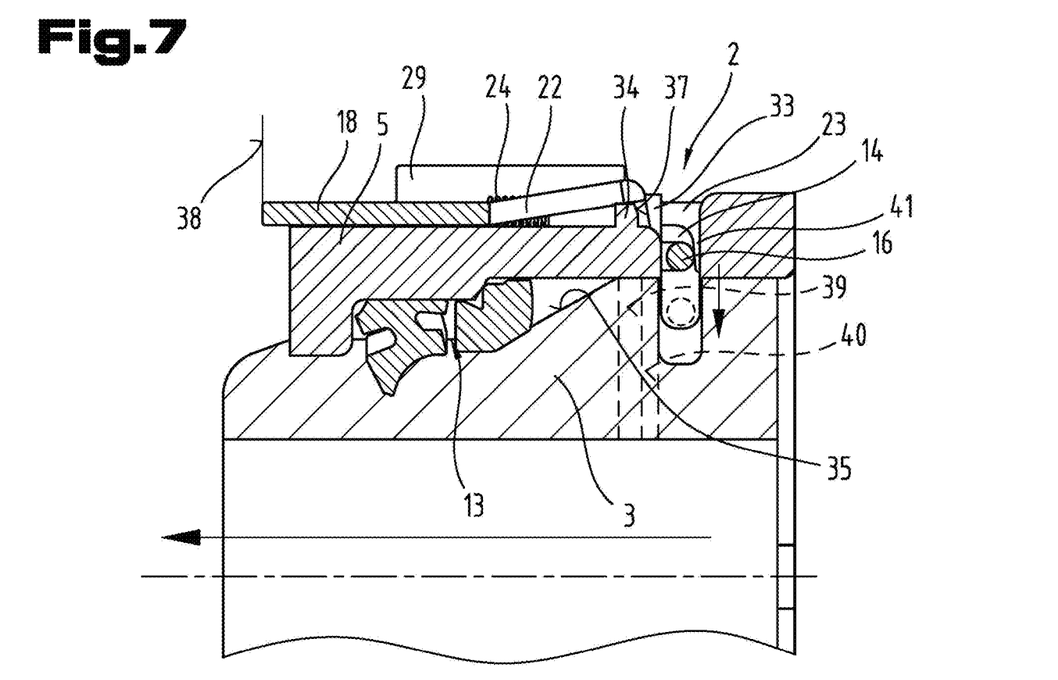
FIG. 7 a fourth method step for inserting the mating plug connector into the plug connector.

If, as can be seen from FIG. 7, the mating plug connector 3 is now inserted into the plug connector 2 to such an extent that the latching region 16 of the locking element 6 is located above the securing groove 15, the latching region 16 of the locking element 6 falls into the securing groove 15 due to the elastic pretension of the locking element 6. This causes the latching region 16 to disengage from the latching hook 41 of the second latching element 23. The indicator element 18 is thus released for displacement into its indicator position 27 by the force of the spring element 24. Since in the position according to FIG. 7 the first actuating lug 36 of the first latching element 22 is in contact with the cylinder section 40 of the mating plug connector 3 and thus the first latching projection 33 is pressed radially outside the first latching lug 34, there is also no resistance from the first latching element 22 to the displacement of the indicator element 18 into its indicator position 27.

Figure 8:
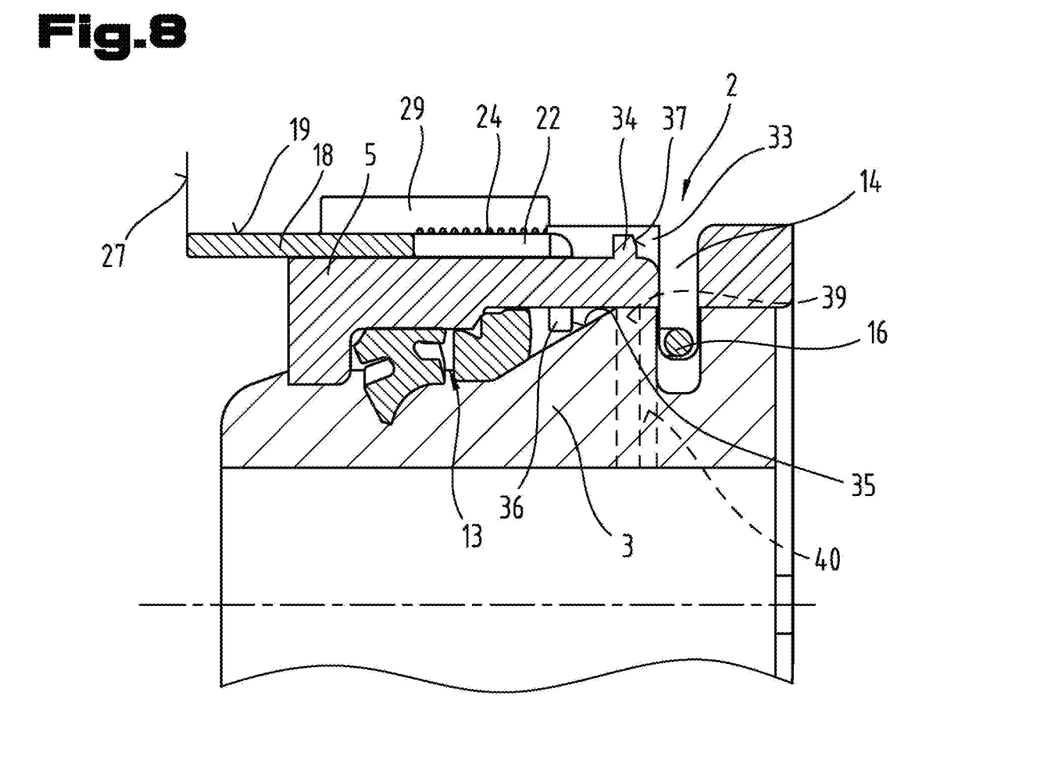
FIG. 8 a fifth method step for inserting the mating plug connector into the plug connector.

In the illustration according to FIG. 8, the correctly joined and correctly locked position of the mating plug connector 3 in the plug connector 2 is shown. As can be seen from FIG. 8, the latching region 16 of the locking element 6 is accommodated in the securing groove 15. Furthermore, the indicator element 18 is positioned in the indicator position 27. In this regard, the first latching element 22 can be pushed back into its undeformed initial position due to its elasticity.

The exemplary embodiments show possible embodiment variants, and it should be noted in this respect that the disclosure is not restricted to these particular illustrated embodiment variants of it, but that rather also various combinations of the individual embodiment variants are possible and that this possibility of variation owing to the technical teaching provided by the present disclosure lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

| List of reference numbers | |
|---|---|
| 1 | Plug assembly |
| 2 | Plug connector |
| 3 | Mating plug connector |
| 4 | Tube |
| 5 | Connector body |
| 6 | Locking element |
| 7 | Longitudinal axis of the plug connector |
| 8 | First casing section |
| 9 | Inner casing face |
| 10 | Outer casing face |
| 11 | Seal receptacle of plug connector |
| 12 | Annulus |
| 13 | Receiving space |
| 14 | Passage |
| 15 | Securing groove |
| 16 | Latching region |

-continued

List of reference numbers

| | |
|---|---|
| 17 | Holding region |
| 18 | Indicator element |
| 19 | Indicator surface |
| 20 | Code |
| 21 | Cover |
| 22 | First latching element |
| 23 | Second latching element |
| 24 | Spring element |
| 25 | Spring element guide |
| 26 | Rest position |
| 27 | Indicator position |
| 28 | First guide rail |
| 29 | Second guide rail |
| 30 | Receiving opening |
| 31 | Indicator element holder |
| 32 | Spring element counterholder |
| 33 | First latching projection |
| 34 | First latching lug |
| 35 | Cone |
| 36 | First actuating lug |
| 37 | Latching lug slope |
| 38 | Intermediate position |
| 39 | Transition radius |
| 40 | Cylinder section |
| 41 | Latching hook |

The invention claimed is:

1. A plug connector for connecting lines for liquid or gaseous media, comprising:
a connector body which has at least a first casing section which forms a receiving space for receiving a part of a mating plug connector, wherein at least two passages are formed in the first casing section;
a locking element which is provided for securing the plug connector relative to the mating plug connector, wherein the passages in the connector body serve to accommodate the locking element,
wherein an indicator element is formed which has an indicator surface, wherein the indicator element is displaceable between a rest position, in which the indicator surface is at least partly covered, and an indicator position, in which the indicator surface is visible, wherein a spring element is formed which pretensions the indicator element in a direction of the indicator position and wherein the indicator element is coupled to a first latching element and a second latching element, wherein the first latching element is configured to hold the indicator element in the rest position against a spring force of the spring element and wherein the second latching element is configured to hold the indicator element in an intermediate position between the rest position and the indicator position against the spring force of the spring element.

2. The plug connector according to claim 1, wherein the first latching element has a first latching projection and a first latching lug that is formed on the connector body, wherein the first latching projection is in engagement with the first latching lug in an unplugged state of the plug connector and is held in the rest position against the spring force of the spring element.

3. The plug connector according to claim 1, wherein the first latching element comprises a first actuating lug, wherein the actuating lug projects into the receiving space.

4. The plug connector according to claim 3, wherein the first actuating lug protrudes so far into the receiving space that when the actuating lug is pushed radially out of the receiving space, the first latching projection is raised above the first latching lug.

5. The plug connector according to claim 1, wherein the second latching element rests against the locking element when the indicator element is held in the intermediate position.

6. The plug connector according to claim 5, wherein the second latching element has a latching hook which is configured to hook into the locking element in an outwardly displaced position of the locking element.

7. A method for producing a plug connection by means of a plug connector, comprising:
providing the plug connector including:
a connector body which has at least a first casing section which forms a receiving space for receiving a part of a mating plug connector, wherein at least two passages are formed in the first casing section;
a locking element which is provided for securing the plug connector relative to the mating plug connector, wherein the passages in the connector body serve to accommodate the locking element;
an indicator element which has an indicator surface, wherein the indicator element is displaceable between a rest position, in which the indicator surface is at least partly covered, and an indicator position, in which the indicator surface is visible, wherein a spring element is formed which pretensions the indicator element in a direction of the indicator position,
wherein the indicator element is coupled to a first latching element and a second latching element, wherein the first latching element is configured to hold the indicator element in the rest position against a spring force of the spring element and wherein the second latching element is configured to hold the indicator element in an intermediate position between the rest position and the indicator position against the spring force of the spring element;
providing a mating plug connector, wherein the mating plug connector has a cone and a securing groove;
inserting the mating plug connector into the plug connector, wherein the locking element and the first latching element come to rest on the cone and are pressed outwards by axial insertion of the mating plug connector into the plug connector, wherein the indicator element is displaced from a rest position into the intermediate position at a first insertion depth of the mating plug connector, wherein in the intermediate position, the second latching element cooperates with the locking element, and the indicator element is held in the intermediate position by the locking element, wherein upon further axial insertion of the mating plug connector into the plug connector, the locking element falls into the securing groove and the second latching element is released, whereby the indicator element is displaced into the indicator position by the spring element.

8. The method according to claim 7, wherein a first actuating lug of the first latching element protrudes into the receiving space, wherein during axial insertion of the mating plug connector into the plug connector, the actuating lug rests against the cone of the mating plug connector and is pushed radially out of the receiving space by the latter, wherein, in this process, a first latching projection arranged on the first latching element is lifted over a first latching lug arranged on the connector body.

9. The method according to claim 7, wherein the second latching element has a latching hook which hooks into the locking element when the latter is in an outwardly displaced position, whereby the indicator element is held in the intermediate position by the locking element against the spring force of the spring element.

10. The method according to claim 7, wherein the plug connector is configured such that the first latching element secures the indicator element in the rest position again when the mating plug connector is pulled out of the plug connector without the locking element having fallen into the securing groove.

11. A plug connector for connecting lines for liquid or gaseous media, comprising:
- a connector body which has first casing section which forms a receiving space for receiving a part of a mating plug connector, wherein passages are formed in the first casing section; and
- a locking element which is provided for securing the plug connector relative to the mating plug connector, wherein the passages in the connector body serve to accommodate the locking element;
- wherein an indicator element is formed which has an indicator surface, wherein the indicator element is displaceable between a rest position, in which the indicator surface is at least partly covered, and an indicator position, in which the indicator surface is visible,
- wherein a spring element is formed which pretensions the indicator element in a direction of the indicator position and wherein the indicator element is coupled to a first latching element and a second latching element,
- wherein the first latching element is configured to hold the indicator element in the rest position against a spring force of the spring element, and
- wherein the second latching element is configured to hold the indicator element in a position between the rest position and the indicator position.

12. The plug connector according to claim 11, wherein the first latching element has a first latching projection and a first latching lug that is formed on the connector body.

13. The plug connector according to claim 11, wherein the first latching element comprises a first actuating lug.

14. The plug connector according to claim 11, wherein a first actuating lug protrudes into a receiving space.

15. The plug connector according to claim 11, wherein the second latching element rests against the locking element when the indicator element is held in the intermediate position.

16. The plug connector according to claim 11, wherein the second latching element has a latching hook which is configured to hook into the locking element in an outwardly displaced position of the locking element.

* * * * *